United States Patent [19]

Sanford et al.

[11] 3,828,477

[45] Aug. 13, 1974

[54] CLOSED LOOP GRINDER INFEED CONTROL SYSTEM W/AUTOMATIC COMPENSATION FOR WHEEL DIAMETER CHANGES DUE TO DRESSING OPERATIONS

[75] Inventors: Norman Ray Sanford, Piqua; Alan Dale Wainscott; Billy Keith Skelton, both of Dayton, all of Ohio

[73] Assignee: The Bendix Corporation, Southfield, Mich.

[22] Filed: May 7, 1973

[21] Appl. No.: 357,755

[52] U.S. Cl. .................................. 51/5, 51/165.87
[51] Int. Cl. ... B24b 49/18, B24b 49/10, B24b 51/00
[58] Field of Search ............. 51/5 D, 165 R, 165.71, 51/165.75, 165.76, 165.77, 165.87, 165.88

[56] References Cited
UNITED STATES PATENTS

| | | | |
|---|---|---|---|
| 3,403,480 | 10/1968 | Robillard | 51/165.87 |
| 3,513,596 | 5/1970 | Beauchet | 51/165.87 X |
| 3,640,024 | 2/1972 | Stahn | 51/165.87 |
| 3,721,047 | 3/1973 | Ryan | 51/165.78 |
| 3,736,704 | 6/1973 | Robillard | 51/165.87 X |

FOREIGN PATENTS OR APPLICATIONS 1,007,749 10/1965 Great Britain .................. 51/165.87

*Primary Examiner*—Donald G. Kelly
*Attorney, Agent, or Firm*—John R. Benefiel

[57] ABSTRACT

An infeed control system for a grinding machine is disclosed which includes a distance transducer generating trains of electrical pulses in response to wheelhead movement in either direction on the infeed slide, and a first and second up-down counter receiving and counting these electrical pulses generated, the first of these counters counting up in response to pulses generated by grinding infeed movement, the second counting up in response to pulses generated in response to dressing infeed movement. A series of comparator networks compares these counts with preset values set in the series of comparators, and generates sequencing control signals there from at points in the infeed motions of the wheelhead corresponding to the preset values. To compensate for the effect of the changes in wheel diameter due to dressing operations, an arrangement is provided which inhibits the counting up of the counter responding to electrical pulses generated by grinding infeed motion occurring after each dressing operation for a count total equal to the dressing depth.

6 Claims, 4 Drawing Figures

3,828,477

CLOSED LOOP GRINDER INFEED CONTROL SYSTEM W/AUTOMATIC COMPENSATION FOR WHEEL DIAMETER CHANGES DUE TO DRESSING OPERATIONS

BACKGROUND OF THE INVENTION

1. Field of the Invention

This invention concerns grinders, and more particularly, grinder infeed control systems for automatically controlling the dressing and grinding infeed motions of the wheelhead.

2. Description of the Prior Art

Grinding machines adapted for production often are equipped for automatic control of the work cycle. This work cycle usually includes an initial rapid infeed of the wheelhead, a subsequent slower infeed as the workpiece is approached and rough grinding is initiated, and a finish grind at an even slower infeed rate until the workpiece final dimension is attained. This operation is followed by a dwell or sparkout period and retraction of the wheelhead to a neutral position before the starting of another work cycle.

Periodically, after a certain number of these cycles has taken place, dressing and reshaping of the grinding wheel by a diamond dresser or crush roll will become necessary.

To carry out this operation, the wheelhead is caused to move into a dress roll or diamond dresser with a similar type sequence, i.e., a rapid infeed, followed by a slower dress infeed, a dwell period, and finally a retraction to the neutral position for the start of another grind cycle.

These motions have in the past usually been performed by means of mechanical stops and limit switches, controlling hydraulic cylinder infeed rates, the stop positions being adjusted during setting up of the machine by the operator.

It can be appreciated that the proper position for the start and finish of these various types of infeed motions obviously depends on the precise diameter of the grinding wheel since the point of contact between the grinding wheel and the workpiece determines the beginning of the grinding action and the finished size of the workpiece. This is also true of the dress cycle in regards to contact between the dress roll and the grinding wheel.

Accordingly, some arrangement to compensate for changes in grinding wheel diameter due to dressing operations must be included in any such automatically controlled machines.

In the aforementioned machines using limit switches and mechanical stops, relatively complex mechanisms were required to provide such compensation, adding significantly to the cost of such machines.

The reason such mechanisms are complex is that the compensation problem is not as easily handled as it would seem on first impression. That is, if the length of the grinding infeed motion were simply extended by the dress depth the portion of the total infeed motion in which relatively slow grind would grow longer and longer unnecessarily, slowing the production rate of the machine. Thus, the entire series of transition points should preferably be compensated for the changes in wheel diameter, this requirement leading to the relatively complex mechanisms referred to.

Examples of typical prior art devices are described in U.S. Pat. Nos. 3,403,480; 3,513,596; and 3,721,047.

Accordingly, it is an object of the present invention to provide an infeed control system which provides such a compensation without involving either complex mechanical devices or unduly complex electronic circuits.

SUMMARY OF THE INVENTION

This and other objects which will become apparent upon a reading of the following specification and claims it has been found can be accomplished by providing a closed loop control system of the type in which movement of the wheelhead relative the workpiece and dress roll is measured by a distance transducer which generates trains of electrical pulses corresponding to movement towards either the workpiece or the dresser, these pulses being counted in a pair of counters receiving and counting these electrical pulses generated, one of these counters counting up in response to pulses generated by grinding infeed movement, the other counting up in response to dressing infeed movement. Comparator networks compare these counts to preset values, and generate sequencing control signals therefrom at points in the infeed motions of the wheelhead corresponding to the preset values. To compensate for the effect of the changes in wheel diameter due to dressing operations, an arrangement is provided which inhibits the counting up of the counter responding to electrical pulses generated by grinding infeed motion occurring after each dressing operation for a count total equal to the dressing depth. Also, the dressing counter is rezeroed at the end of each dressing operation thereby compensating the dressing counter for wheel diameter changes.

DETAILED DESCRIPTION

In the following detailed description certain specific terminology will be utilized for the sake of clarity and a specific embodiment will be described in order to provide a complete understanding of the invention, but it is to be understood that the invention is not so limited and may be practiced in a variety of forms and embodiments.

Figure 1:
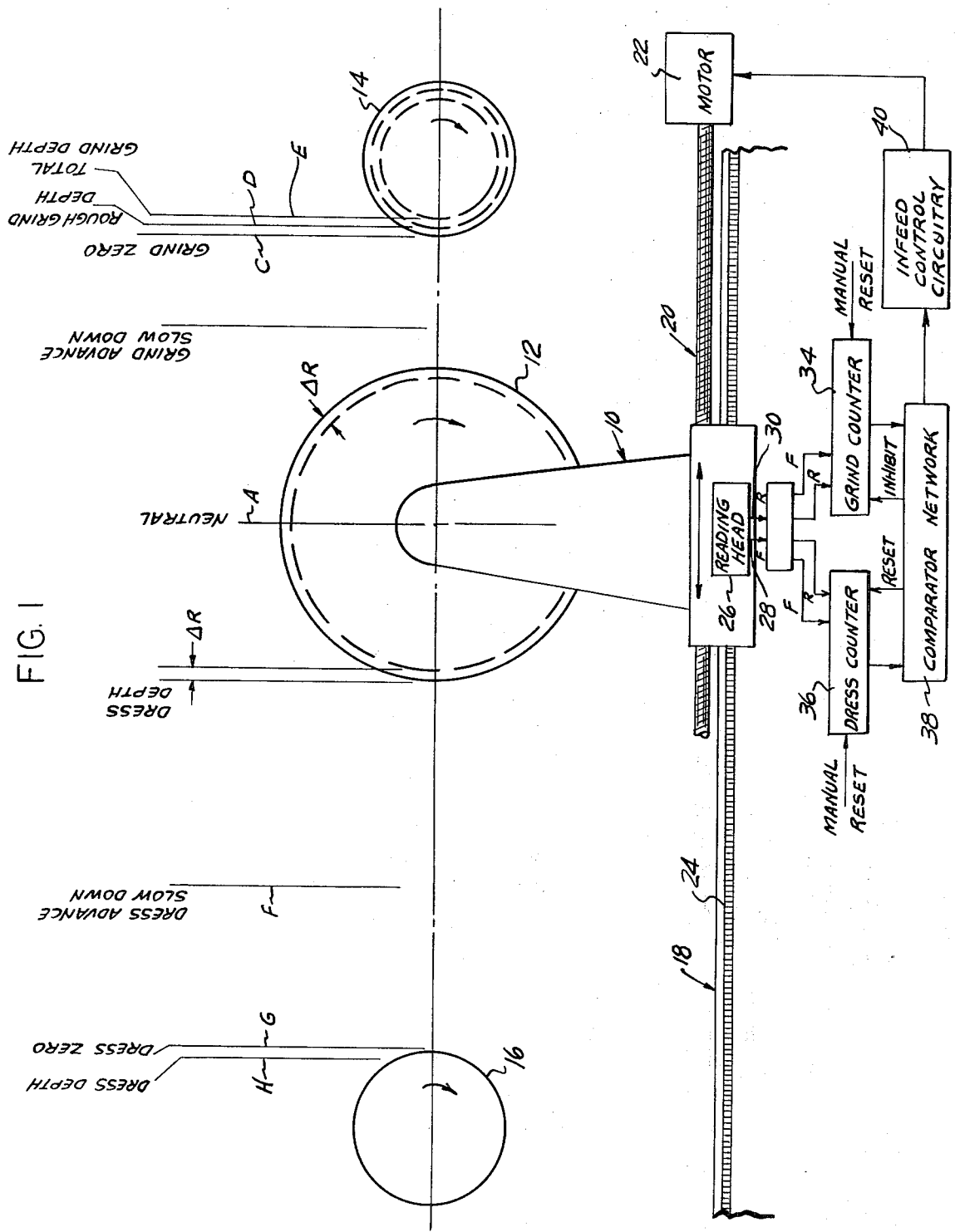
FIG. 1 is a diagrammatic representation of a system according to the present invention.

Referring to FIG. 1, a wheelhead 10 is depicted having a grinding wheel 12 mounted thereon adapted to be rotated by means of a motor (not shown) or other drive means during the grinding and dressing operations.

The wheelhead 10 is mounted between and adapted to be driven alternatively toward or away either the workpiece 14 or the dress roll 16 to perform the machining and dressing operations respectively in the manner well known in the art.

For this purpose, the wheelhead 10 is mounted on a slide 18 and driven by an infeed drive means, depicted in FIG. 1 as a power screw 20 rotated by means of a motor 22.

This infeed motion is controlled by the system to be hereinafter described so as to carry out the normal operating cycles noted in FIG. 1. That is, during a grind cycle, the wheelhead 10 moves from the neutral position A at a rapid traverse rate to point B where the infeed is slowed to a rough grind advance rate. At point C the grinding wheel 12 periphery engages the workpiece and rough grinding begins. At point D the infeed is slowed to a finish grind advance rate, which continues until point E is reached corresponding to the finished workpiece 14 diameter.

Normally a dwell or spark out period is provided in which the grinding wheel 12 and workpiece 14 rotation continues for a time to obviate the effect of workpiece distortion by the grinding loads, and thereafter the wheelhead is rapidly retracted to the neutral or A position to end the cycle.

After a certain number of these cycles occurs (the exact number depending on the particular requirements of the application at hand) a dressing operation will be required, and a dress cycle will be initiated.

This cycle also includes a rapid traverse of the wheelhead 10 to a point F intermediate the neutral position and the dress roll 16 where the infeed is slowed to a dress infeed rate prior to the grinding wheel 12 engaging the dress roll 16 periphery at point G whence dressing occurs by simultaneous rotation of both the dress roll 16 and the grinding wheel 12. The wheelhead 10 is advanced to point H during the dressing operation which point corresponds to the dress depth preselected by the operator during set up. After a short dwell period the wheelhead 10 is then again retracted to the neutral position A.

The grinding wheel 10 thus undergoes a reduction in diameter equal to $\Delta R$, the selected dressing depth. While this is a simplified and incomplete description of this cycle, inasmuch as the nature and practice of these grinding and dressing cycles in themselves are well known in the art, a description of all of the details involved are not felt necessary to be here included for a clear understanding of the invention.

Signals indicating the attainment of each of the wheelhead 10 positions A through H are generated by the arrangement according to the present invention, which arrangement includes means for generating trains of electrical pulses corresponding to movement of the wheelhead 10 on way 18 towards either the workpiece 14 or the dress roll 16.

This means would advantageously take the form of the well known Moire fringe type distance transducer. This transducer includes a precision optical grating 24 affixed to the machine frame parallel to the line of movement of the wheelhead 10 along way 18.

A reading head 26 is carried by the wheelhead 10 which reading head conventionally includes a second optical grating (not shown) slightly skewed to the grating 24. Any movement of the wheelhead 10 along way 18 results in shifting of a light and dark Moire fringe pattern which shift is detected by photocells which generate corresponding electrical pulse signals. By an arrangement now well known in the art, the direction of this movement is also distinguished, and a train of these electrical signals is generated corresponding to the extent of movement of the wheelhead 10, over either output 28 or 30 depending on the direction of the movement, i.e., either "forward" F, or "reverse", R.

These electrical pulses are shaped, amplified and divided by suitable circuitry 32 to produce output trains of electrical pulses suitable for use in control networks.

As all of these elements are now well known in the art and do not in themselves comprise the present invention, the details thereof are not here included. Reference may be had to U.S. Pat. Nos. 2,886,716; 2,886,717; 3,713,139 for examples and details of such systems.

According to the present invention, the electrical pulses generated by the single transducer arrangement are counted in a first and second up-down digital counter means, i.e., a grind counter 34, and a dress counter 36. The grind counter 34 is adapted to receive and count the electrical pulses indicative of movement in either direction, but counts "up" in response to the train of electrical pulses generated in response to movement towards the workpiece 14, and down in response to the train of signals generated by movement away therefrom, while the dress counter 38 counts up in response to the train of signals generated by movement of the wheelhead 10 towards the dress roll 16 and down in response to the train of signals generated by movement away therefrom.

The counts contained in the grind counter 34 and the dress counter 36 are compared to preset values in a comparator network 38, each value corresponding to one of the points A through H described above. The comparator network 38 which will be described herein in further detail generates control signals whenever the counts compared therein attain one of these preset values, which control signals are utilized by suitable control circuitry 40 which controls the motor or motors 22 so as to properly control the infeed motion of the wheelhead 10 as described above.

These control signals would also be used to control other elements on the machine such as the dress roll drive, indicator lights, grinding wheel drive, etc. as will be apparent to those skilled in the art.

In order to compensate for the changes in the grinding wheel diameter $\Delta R$, the comparator network 38 generates a reset signal which resets the dress counter 36 to zero after the completion of the dressing operation but before retraction of the wheelhead 10, and in addition generates a signal which inhibits the counting of the electrical pulses generated during initial return movement of the wheelhead 10 by the grind counter 34. This inhibit signal is maintained until the wheelhead 10 has retracted a distance just equal to the depth of the dressing, and thereafter the grind counter 34 is allowed to count normally.

Figure 2:
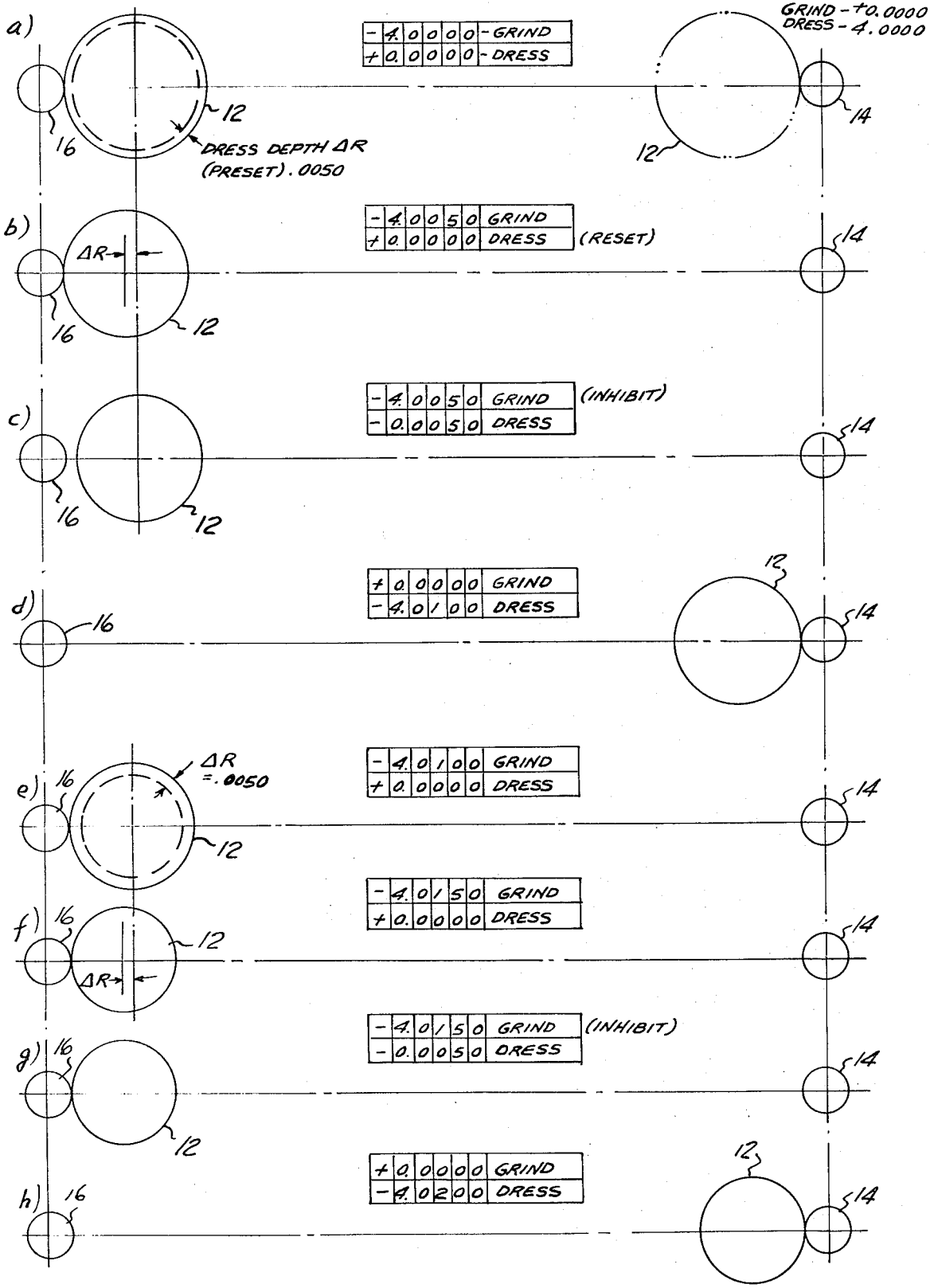
FIG. 2 is a diagrammatic representation of operating cycles of the system depicted in FIG. 1.

How this provides the necessary compensation can be better understood by reference to FIG. 2 which diagrammatically represents two successive dress-grind cycles, with an accompanying display of what a decimal readout of the contents of the counter would indicate if such a readout were provided (although it would not in most situations).

Position a shows the grinding wheel 12 moved through the initial set up positions, i.e. the grind counter is manually reset or set to zero at the point of contact of the grinding wheel 12 and the workpiece 14, (the grinder wheel 12 is shown in phantom in this position) while the dress counter 36 is set to zero at the point of contact of the grinding wheel 12 with the dress roll 16 as indicated. In the example shown the distance the wheelhead 10 moves in moving to these extremes is taken for illustrative purposes as 4.0000 inches. It will be recalled that the dress counter 36 counts up in response to movement of the wheelhead towards the crush roll 16, while the grind counter 34 counts up in response to movement towards the workpiece 14. Accordingly, in the first extreme position the grind counter 34 would read 0.0000, and the crush counter 36 —4.0000, while in the second position the grind counter would read —4.0000 while the dress counter would read 0.0000.

The preselected crush depth $\Delta R$ is shown by the broken line inside the grinding wheel 12, indicated for illustrative purposes as 0.0050 inches.

Position b shows the grinding wheel 12 after the dress cycle has taken place and its diameter has been reduced by twice the dress depth $\Delta R$. At this point the dress counter 36 is reset to zero as shown, and since the wheelhead 10 has moved towards the dress roll 0.0050 inches during the operation, the grind counter would now read —4.0050 inches. However, at this point the inhibit signal is generated so that as the wheel moves back towards the workpiece 14, its count remains the same until it has moved a distance equal to the dress depth, i.e., 0.0050 as measured by the dress counter 36 which would then read —0.0050. This situation is shown in position c, FIG. 2.

Thus, when the grind counter 34 again reaches zero, the grinding wheel 12 will be in the correct corresponding position just in contact with the workpiece 14 as shown in position d to thus have compensated for the change in wheel diameter in moving towards the workpiece 14.

At the same time the dress counter would read —4.0100, and, since the total distance between extremes has increased by 2 $\times R$ or 2 $\times$ 0.0050 = 0.0100 it can be seen that the dress counter 36 will be correctly at zero when the wheelhead 10 moves the grinding wheel 12 just into contact with the dress roll 16, as shown in position e.

This compensation is effective over cumulative cycles as indicated by the repeat cycle shown in positions f, g and h, which shows that the correct "readings" continue to be contained within the grind and dress counters through successive cycles.

Figure 3:
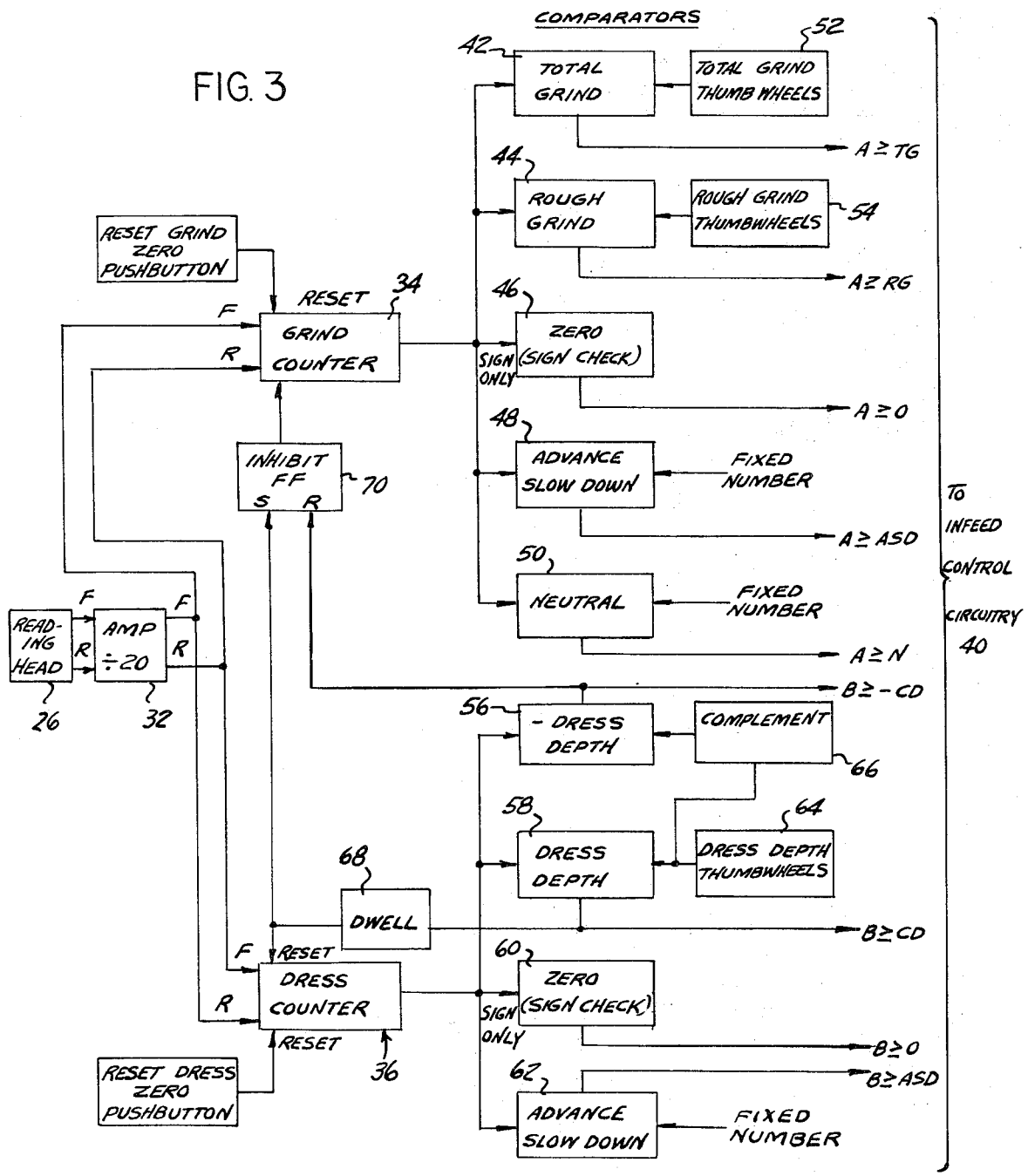
FIG. 3 is a detailed diagrammatic representation of the counter-comparator network shown in FIG. 1.

By reference to FIG. 3 which shows in detail the comparator network 38 which generates the various control reset and inhibit signals described, the relative simplicity of the necessary electronic circuitry afforded by this two counter approach can be readily appreciated.

The count contained in the grind counter 34 is compared to a preselected count in a series of comparators, total grind comparator 42, rough grind comparator 44, grind zero comparator 46, advance slow down comparator 48 and neutral comparator 50. These comparators 42, 44, 48 and 50 are of the type which produce an output signal only when the digital value being compared attains the value of a preselected input. In the case of the total grind comparator 42 and the rough grind comparator 44, these preselected values are set by means of thumbwheel switches 52 and 54 respectively, which allows the operator to manually set the value corresponding to the total grind required for the particular job as well as the correct proportion of rough grind.

On the other hand, the comparators 48 and 50 may have fixed or hardwired signal inputs since for a given machine design, the neutral position and the point of advance slow down can be fixed independently of the nature of the particular job.

Comparator 46 is set to produce an output signal whenever the count in the grind counter 34 goes to zero, to provide an indicator signal for the point at which the grinding wheel is supposed to just be contacting the workpiece.

The dress counter 36 contents are similarly compared in a series of comparators to preselected digital values, a minus dress depth comparator 56, a dress depth comparator 58, a zero comparator 60 and an advance slow down comparator 62.

The compared value for the dress depth comparator 58 is generated from a thumbwheel switch 64 which value is set by the operator during the initial set up. This value is then inverted in inverter 60 and transmitted to the minus dress depth comparator 56.

The advance slow down comparator 62 similar to that associated with the grind counter 34 would have a fixed hardwired signal input, while the zero comparator 60 will output a signal whenever the dress count goes to zero.

The reset and inhibit functions are carried out by means of the dress counter 36 and the dress depth comparators 56 and 58. The reset of the dress counter 36 is carried out by transmitting the output signal of the dress depth comparator 58 to a suitable reset input of the dress counter 36 so that when the infeed motion as measured by the dress counter 36 has reached the dress depth (and the dwell period has elapsed as indicated by a suitable delay 68) the dress counter 36 is reset to zero.

The inhibit function is carried out by also transmitting the output signal to an input of a SR flip-flop 70. This signal sets output of the SR so that an inhibit signal is transmitted to the grind counter 34, causing it to not count pulses received by it as long as the inhibit signal is present.

The inhibit signal is discontinued by transmitting the output of the minus dress depth comparator 56 to the other input of the SR flip-flop to clear the output inhibit signal when the wheelhead 10 has moved out a distance equal to the dress depth so that the grind counter 34 again begins to register the pulses received, to thus provide the functions described above.

All of these signals are utilized by the control circuitry 40 providing indications and proper control of the infeed motion and other functions as indicated.

Inasmuch as such circuitry may be of conventional design and does not in itself constitute the present invention a detailed description thereof is not here included.

Similarly, further circuit details of the comparator network 38 and a detailed explanation of the various elements such as the comparators, flip flops, counters, and thumbwheel switches are not included here as these components are very well known in the art and the design requirements thereof in arriving at a specific circuit design are also well known to those skilled in the art.

It can be seen that this arrangement presupposes that the dress depth selected actually corresponds to the final position of the wheelhead 10. In the event such supposition is not correct for a particular design due to the characteristics of the actuators and other factors, it may be desirable to modify the system to prevent resulting cumulative errors in the grind counter 34.

Figure 4:
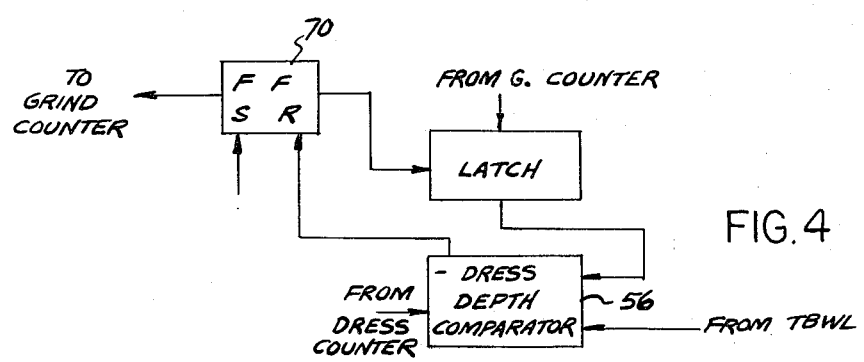
FIG. 4 shows a portion of the counter-comparator network depicted in FIG. 3 modified according to another embodiment of the system according to the present invention.

Such a modification is shown in FIG. 4, and involves latching the last two digits from the grind counter 34 into the minus dress depth comparator 56 during the inhibit period, so that the dress count is in effect compared to the actual dress depth, presuming the magnitude of variation is less than that corresponding to the last two digits. For example, the thumbwheel input set for a dress depth of 0.0050 inches would read in a signal corresponding to 0.0050 inches, and taking as an example, that the wheelhead 10 had overshot this depth by 0.00031 inches, the latched in signal at the point at which the dress counter 36 equalled the minus dress depth comparator value 56 would be 0.00031 inches so that the corrected comparator value would be 0.00531 inches to precisely control the grind counter 34 reading.

Many variations of these arrangements are of course possible, such as alternative distance transducers, alternate logic networks, etc. Also, while the dressing application has been described with the use of a dresser roll, it is manifest that the system is similarly applicable to diamond dressing, for example.

It can be appreciated from this description that automatic compensation is provided with a relatively simple arrangement as contrasted with the costly prior art systems described above.

I claim:

1. An infeed control system in a grinding machine of the type including a grinding wheel, workpiece support means, dresser means, and means for supporting said grinding wheel between said workpiece support means and said dresser means and also including means for advancing said grinding wheel alternatively towards the workpiece support means for machining operations and towards the dresser means for dressing operations, the infeed control system including:

distance transducing means for generating a train of signals, said signal trains corresponding to the extent of movement of said grinding wheel towards either said dresser means or said workpiece support means respectively;

first up-down counter means counting up in response to said signals in said train generated by said distance transducing means in response to movement of said grinding wheel towards said workpiece support and down in response to said signals in said train generated in response to movement away therefrom;

second up-down counter means counting up in response to said signals in said train generated by said distance transducing means in response to movement of said grinding wheel towards said dresser means and counting down in response to said signals in said train generated in response to movement of said grinding wheel towards said workpiece support means;

control means controlling said motion of said grinding wheel in response to the attainment of predetermined counts in said first and second up-down counter means, including means discontinuing the infeed movement of said grinding wheel towards said workpiece support means in response to the attainment of a predetermined count in one of said first or second up-down counter means and discontinuing the infeed movement of said grinding wheel towards said dresser means in response to the attainment of a predetermined count in one of said first or second up-down counter means.

2. The system of claim 1 wherein said control means includes means discontinuing said infeed motion of said grinding wheel towards said workpiece support in response to the attainment of a predetermined count in said first up-down counter means and discontinuing said infeed motion of said grinding wheel towards said dresser means in response to the attainment of a predetermined count in said second up-down counter means.

3. The system of claim 2 wherein said control means includes inhibit means inhibiting said first counter means from counting in response to said signals during initial movement of said grinding wheel away from said dresser means after said dressing operations until said grinding wheel has moved a distance towards said workpiece support means corresponding to a preselected dressing depth removed from the grinding wheel by said dressing operations.

4. The system of claim 3 wherein said inhibit means includes means responsive to the attainment of a predetermined count in said counter means corresponding to said preselected dressing depth.

5. The system of claim 2 wherein said control means includes means resetting said second counter means to zero after said dressing operations but before return movement of said grinding wheel.

6. An infeed control system in a grinding machine of the type including a grinding wheel, workpiece support means, dresser means, and means for supporting said grinding wheel between said workpiece support means and said dresser means and also including means for advancing said grinding wheel alternatively towards the workpiece support means for machining operations and towards the dresser means for dressing operations, the infeed control system including:

means responding to movement of said grinding wheel towards said workpiece support means and towards said dresser means to produce signals corresponding to the extent of movement in either direction;

control means responsive to said signals to discontinue infeed movement of said grinding wheel towards said workpiece support means or said dresser means in response to the attainment of signals corresponding to predetermined movement in either direction respectively;

inhibit means inhibiting the response of said means responding to movement of said grinding wheel during initial movement of said grinding wheel away from said dresser means after dressing operations until said grinding wheel has moved towards said workpiece support means a distance corresponding to preselected dress depth to be removed during said dressing operations.

* * * * *